United States Patent

Becker et al.

[11] Patent Number: 4,486,198
[45] Date of Patent: Dec. 4, 1984

[54] NAVY DYE MIXTURES

[75] Inventors: Ernst Becker, Ludwigshafen; Udo Bergmann, Darmstadt; Helmut Degen, Frankenthal; Guenter Hansen, Ludwigshafen; Reinhold Krallmann, Weisenheim, all of Fed. Rep. of Germany

[73] Assignee: BASF Aktiengesellschaft, Fed. Rep. of Germany

[21] Appl. No.: 570,455

[22] Filed: Jan. 13, 1984

[51] Int. Cl.³ .............................................. C09B 29/08
[52] U.S. Cl. ........................................... 8/639; 8/922; 8/696
[58] Field of Search ............................................ 8/639

[56] References Cited

U.S. PATENT DOCUMENTS

| | | | |
|---|---|---|---|
| 4,321,055 | 3/1982 | Hansen et al. | 8/639 |
| 4,329,148 | 5/1982 | Hansen et al. | 8/639 |
| 4,386,934 | 6/1983 | Bergmann et al. | 8/639 |
| 4,389,216 | 6/1983 | Bergmann et al. | 8/639 |
| 4,405,330 | 9/1983 | Bergmann et al. | 8/639 |

Primary Examiner—A. Lionel Clingman
Attorney, Agent, or Firm—Keil & Weinkauf

[57] ABSTRACT

Navy dye mixtures essentially contain dyes of the formula I

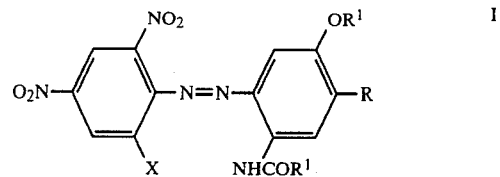

where X is hydrogen, chlorine or bromine, the radicals $R^1$ independently of one another are each methyl or ethyl and R is a radical of the formula

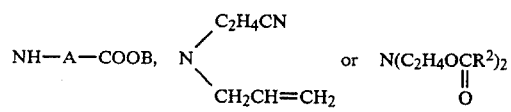

where A is

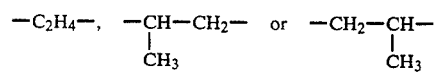

B is unsubstituted or substituted $C_1$–$C_4$-alkyl, phenyl-$C_1$–$C_4$-alkyl, phenoxy-$C_2$- or -$C_3$-alkyl or cyclohexyl and $R^2$ is $C_1$–$C_4$-alkyl, the mixtures containing from 20 to 80 parts of dyes in which R is NH-A-COOB and from 80 to 20 parts of dyes in which R is

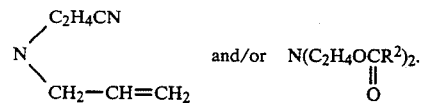

The novel mixtures are very useful for dyeing synthetic polyesters, and give dyeings which have, in particular, very good heatfastness.

3 Claims, No Drawings

NAVY DYE MIXTURES

The present invention relates to navy dye mixtures which essentially contain dyes of the formula I

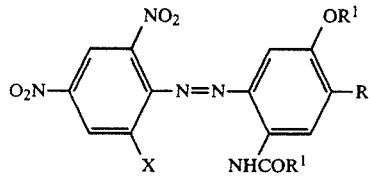

where X is hydrogen, chlorine or bromine, the radicals $R^1$ independently of one another are each methyl or ethyl and R is a radical of the formula

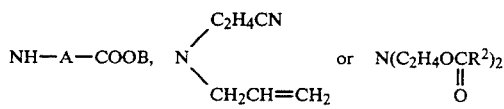

where A is

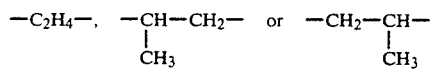

B is unsubstituted or substituted $C_1$-$C_4$-alkyl, phenyl-$C_1$-$C_4$-alkyl, phenoxy-$C_2$- or -$C_3$-alkyl or cyclohexyl and $R^2$ is $C_1$-$C_4$-alkyl, the mixtures containing from 20 to 80 parts of dyes in which R is NH-A-COOB and from 80 to 20 parts of dyes in which R is

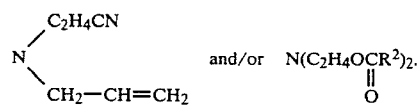

Specific examples of radicals B are $CH_3$, $C_2H_5$, n- and i—$C_3H_7$, n- and i—$C_4H_9$, $C_2H_4OH$, $C_2H_4OCH_3$, $C_2H_4OC_2H_5$, $C_2H_4OC_3H_7$, $C_2H_4OC_4H_9$, $C_2H_4CN$, $C_3H_6OH$, $C_3H_6OCH_3$, $C_3H_6OC_2H_5$, $C_3H_6OC_3H_7$, $C_3H_6OC_4H_9$,

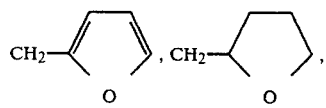

$CH_2C_6H_5$, $CH_2C_6H_4CH_3$, $CH_2C_6H_4Cl$, $CH_2C_6H_4OCH_3$, $C_2H_4C_6H_5$, $C_2H_4C_6H_4CH_3$, $C_3H_6C_6H_5$, $C_4H_9C_6H_5$, $CH$-$C_6H_5$, $C_2H_4OC_6H_5$, $C_3H_6OC_6H_5$, $C_2H_4OC_6H_4CH_3$, $C_2H_4OC_6H_3(CH_3)_2$, and $C_2H_4OC_6H_4Cl$, the radicals $C_3H_6$ and $C_4H_8$ including the n- and isoalkylene groups.

A is, in particular, —$C_2H_4$—. X is preferably bromine, $R^1$ is preferably methyl or ethyl, $R^2$ is preferably methyl and B is preferably benzyl, phenylethyl or phenoxyethyl.

Preferred mixtures contain from 40 to 60 parts of dyes in which R is $NHC_2H_4COOB$ and from 60 to 40 parts of dyes in which R is

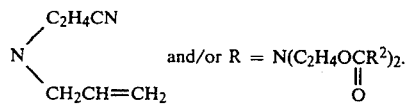

The mixtures can be prepared by mixing the individual components, or synthetically, for example by means of a mixed coupling. The dye mixtures can also contain small amounts of other dyes, e.g. compounds of the formula I where R is $NHC_2H_4CN$, $NHCH_2$—$_{CH=CH_2}$ or $N(CH_2CH=CH_2)_2$, resulting from the synthesis of the coupling components.

On synthetic polyesters, the novel mixtures give navy dyeings which have excellent heatfastness and good wetfastness, lightfastness and fastness to post-setting. Furthermore, they display temperature-independent exhaustion properties, good build up and a resistance to reducing substances.

In the Examples which follow, parts and percentages are by weight, unless stated otherwise.

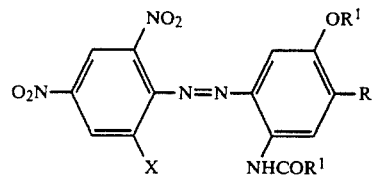

EXAMPLE 1

60 parts of the dye in which X is bromine, $R^1$ is methyl and R is

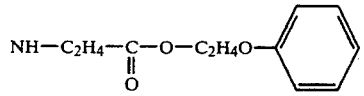

and 40 parts of the dye in which X is bromine, $R^1$ is methyl and R is

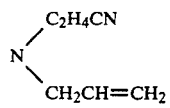

were mixed thoroughly in a ball mill to give 100 parts of a dye mixture according to the invention.

EXAMPLE 2

40 parts of the dye in which X is bromine, $R^1$ is methyl and R is

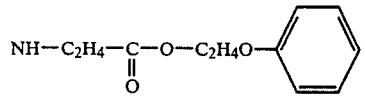

and 60 parts of the dye in which X is bromine, $R^1$ is methyl and R is

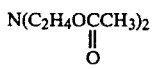

were combined in a ball mill to give 100 parts of a dye mixture according to the invention.

EXAMPLE 3

50 parts of the dye in which X is bromine, $R^1$ is methyl and R is

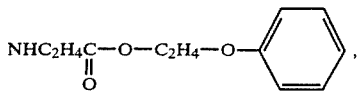

25 parts of the dye in which X is bromine, $R^1$ is methyl and R is

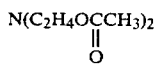

and 25 parts of the dye in which X is bromine, $R^1$ is methyl and R is

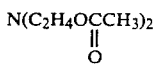

were mixed in a ball mill to give 100 parts of a dye mixture according to the invention.

EXAMPLE 4

26.2 parts of 2-bromo-4,6-dinitroaniline were dissolved in 100 parts of 96% strength sulfuric acid, diazotization was carried out at 5°–10° C. with 32 parts of nitrosylsulfuric acid (11.5% of $N_2O_3$) and the mixture was stirred for a further 16 hours at 10°–15° C. 20.5 parts of 3-(N-β-benzyloxycarbonylethylamino)-4-methoxyacetanilide and 10.9 parts of 3-(N-allyl-N-β-cyanoethylamino)-4-methoxyacetanilide were dissolved in 250 parts of dimethylformamide, the solution was stirred into a mixture of 60 parts of 32% strength hydrochloric acid and 30 parts of water, and 400 parts of ice were added. The diazonium salt solution was then run in at 0°–5° C. When coupling was complete, the suspension was heated at 40° C., the dye was filtered off, washed neutral with water and dried to give 55 parts of a novel dye mixture containing about 35 parts of the dye in which X is bromine, $R^1$ is methyl and R is

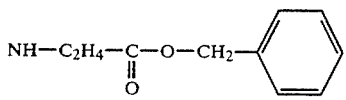

and about 20 parts of the dye in which X is bromine, $R^1$ is methyl and R is

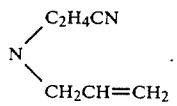

EXAMPLE 5 (HT PROCESS)

100 parts of a polyester yarn were treated in a dyeing bath which contained 1000 parts of water, 2.5 parts of the finely divided dye mixture prepared as described in Example 1 and 1.5 parts of a product obtained by an addition reaction of 50 moles of ethylene oxide with 1 mole of sperm oil alcohol followed by sulfonation of the product. The dyeing was started at 60° C., the temperature was then increased to 125° C. in the course of 20 minutes, and dyeing was continued at this temperature for a further 90 minutes.

The resulting deep navy dyeing had good lightfastness and fastness to thermosetting and very good wet fastness.

EXAMPLE 6 (THERMOSOL PROCESS)

Using a three-roll padding mangle, a polyester fabric was impregnated with a dyeing liquor which contained, per 1000 parts, 45 parts of the finely divided dye mixture prepared as described in Example 2, 15 parts of a 20% strength aqueous solution of a copolymer of acrylic acid with acrylamide and 940 parts of water.

After the impregnation with 65% wet pickup, the fabric was dried at 120° C. and then thermosoled for 1 minute at 220° C. The resulting deep navy dyeing had excellent fastness properties.

EXAMPLE 7 (TEXTILE PRINTING)

A polyester fabric was printed with a paste which contained, per 1000 parts, 50 parts of the finely divided dye mixture prepared as described in Example 3, 20 parts of a reaction product obtained from 1 mole of castor oil and 40 moles of ethylene oxide, 600 parts of a crystal gum thickening, 10 parts of triisobutyl phosphate and 320 parts of water.

After drying, the printed fabric was steam-treated for 15 minutes under 2.5 bar. The resulting deep navy print had excellent fastness properties.

We claim:

1. A navy dye mixture which essentially contains dyes of the formula I

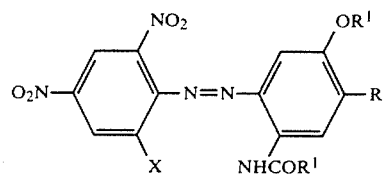

where X is hydrogen, chlorine or bromine, the radicals $R^1$ independently of one another are each methyl or ethyl and R is a radical of the formula

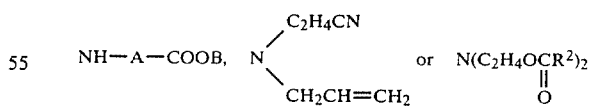

where A is —$C_2H_4$—,

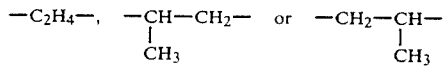

B is unsubstituted or substituted $C_1$–$C_4$-alkyl, phenyl-$C_1$–$C_4$-alkyl, phenoxy-$C_2$- or -$C_3$-alkyl or cyclohexyl and $R^2$ is $C_1$–$C_4$-alkyl, the mixtures containing from 20 to 80 parts of dyes in which R is NH-A-COOB and from 80 to 20 parts of dyes in which R is

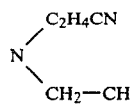 and/or R = N(C₂H₄OCR²)₂.
2. A mixture as claimed in claim 1, wherein X is bromine, R² is methyl and B is benzyl, phenylethyl or phenoxyethyl.
3. A mixture as claimed in claim 1, which contains from 40 to 60 parts of dyes in which R is NHC₂H₄COOB and from 60 to 40 parts of dyes in which R is
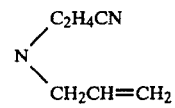
and/or N(C₂H₄OCOR²)₂.
* * * * *

UNITED STATES PATENT AND TRADEMARK OFFICE
CERTIFICATE OF CORRECTION

PATENT NO. : 4,486,198

DATED : December 4, 1984

INVENTOR(S) : Ernst BECKER et al.

It is certified that error appears in the above-identified patent and that said Letters Patent is hereby corrected as shown below:

On the title page add:

-- [30] Foreign Application Priority Data

January 22, 1983 [DE] Fed. Rep. of Germany......3302096 --

Signed and Sealed this

Twenty-fifth Day of June 1985

[SEAL]

Attest:

DONALD J. QUIGG

Attesting Officer

Acting Commissioner of Patents and Trademarks